May 30, 1950

E. ACHARD 2,509,713

DEVICE FOR OBTAINING ELECTRIC FIELDS OF
HIGH-FREQUENCY AND GREAT INTENSITY AND
APPARATUS EMBODYING SUCH DEVICES

Filed May 1, 1945

INVENTOR
EDOUARD ACHARD
By Haseltine, Lake & Co.
ATTORNEYS

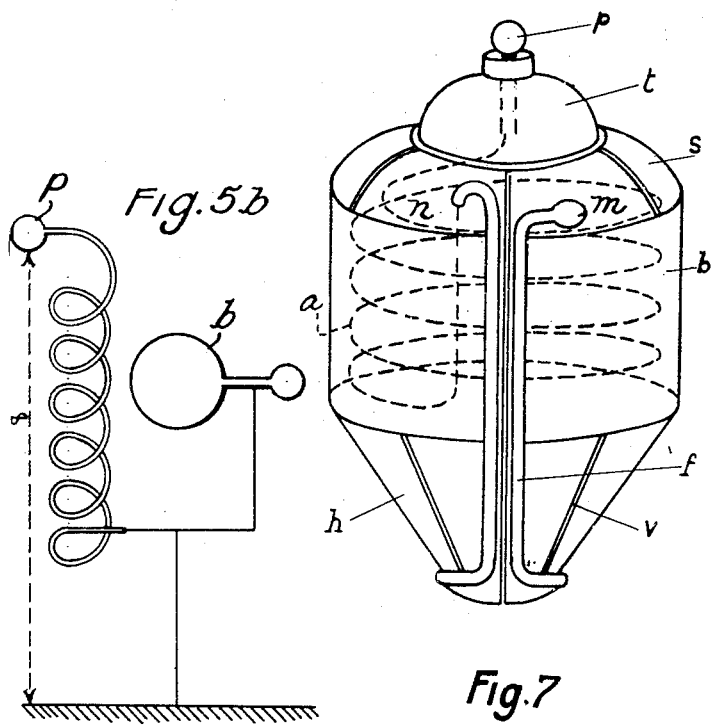
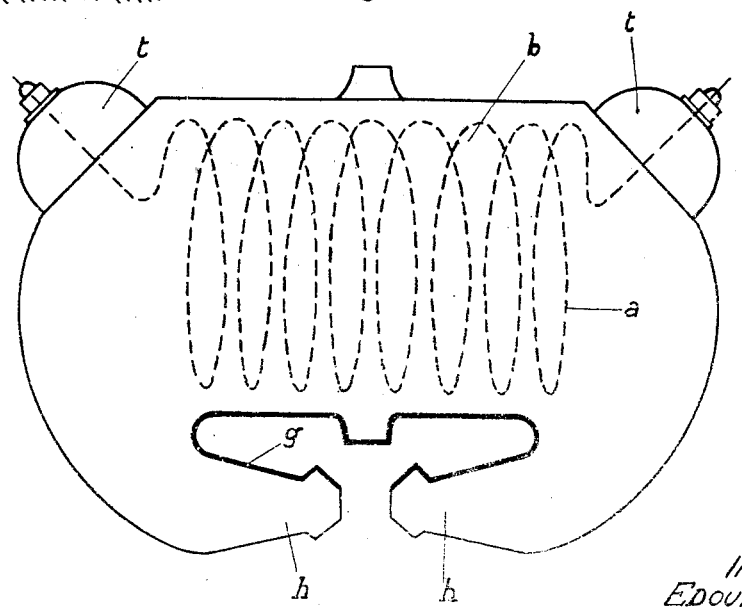

May 30, 1950
E. ACHARD
2,509,713
DEVICE FOR OBTAINING ELECTRIC FIELDS OF
HIGH-FREQUENCY AND GREAT INTENSITY AND
APPARATUS EMBODYING SUCH DEVICES
Filed May 1, 1945
7 Sheets-Sheet 3
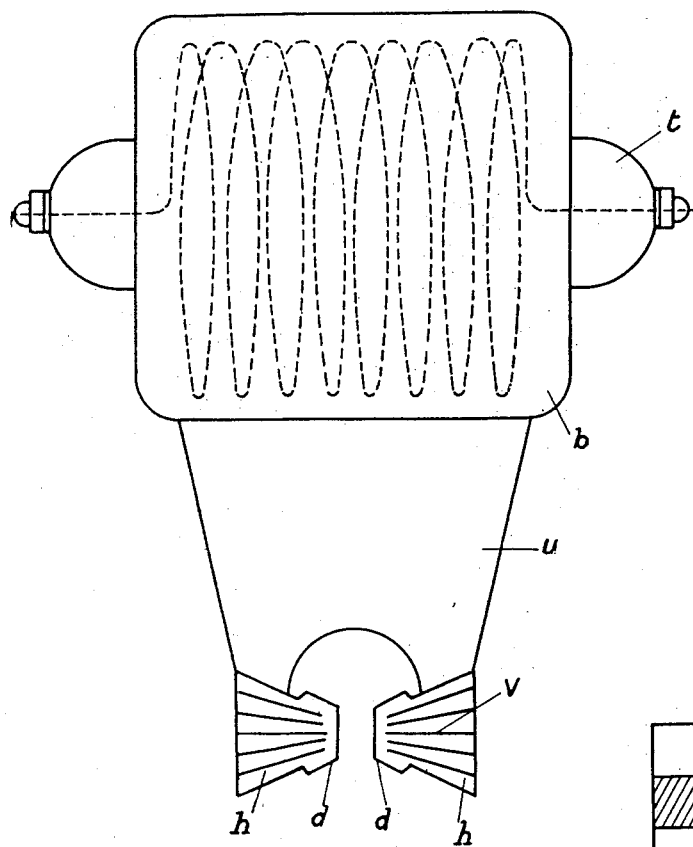
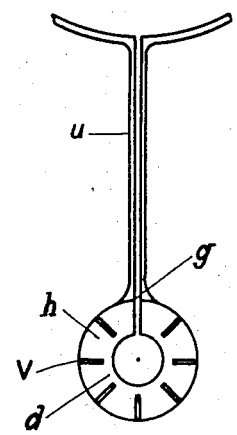
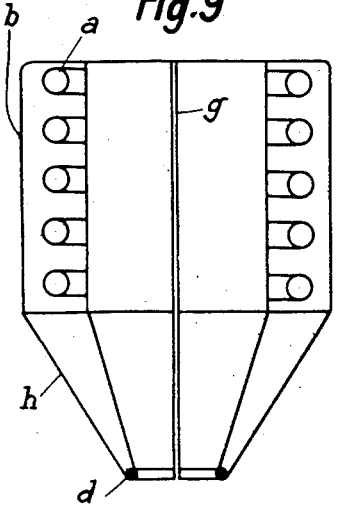
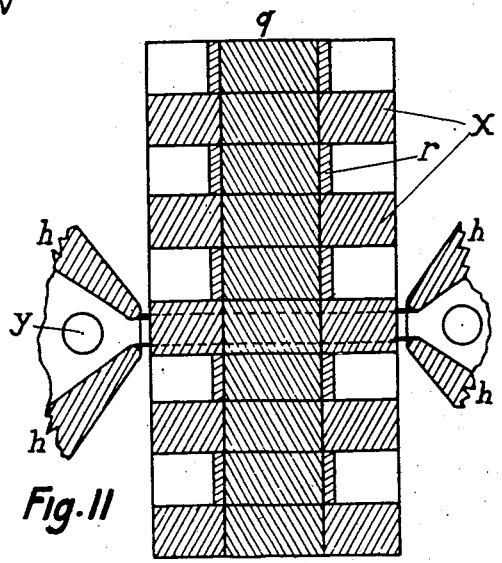
INVENTOR
EDOUARD ACHARD
By Haseltine, Lake & Co.
ATTORNEYS May 30, 1950 E. ACHARD 2,509,713
DEVICE FOR OBTAINING ELECTRIC FIELDS OF
HIGH-FREQUENCY AND GREAT INTENSITY AND
APPARATUS EMBODYING SUCH DEVICES
Filed May 1, 1945 7 Sheets-Sheet 4
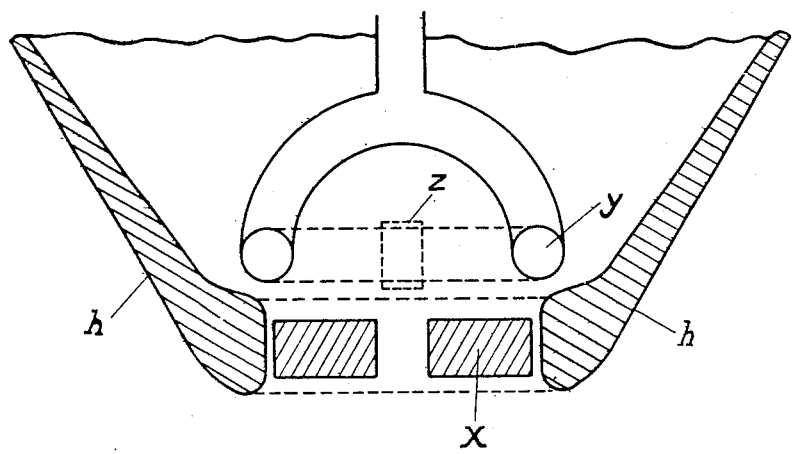
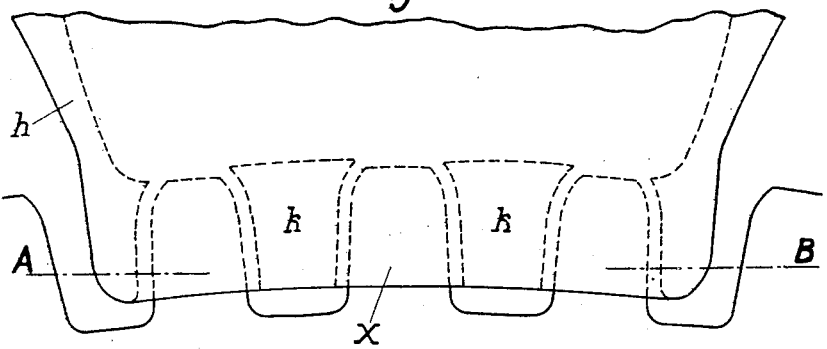
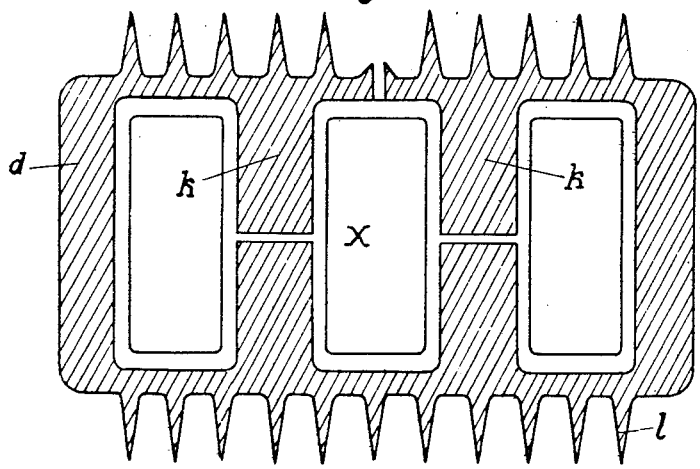
INVENTOR
EDOUARD ACHARD
By Haseltine, Lake &Co
ATTORNEYS May 30, 1950 E. ACHARD 2,509,713
DEVICE FOR OBTAINING ELECTRIC FIELDS OF
HIGH-FREQUENCY AND GREAT INTENSITY AND
APPARATUS EMBODYING SUCH DEVICES
Filed May 1, 1945 7 Sheets-Sheet 5
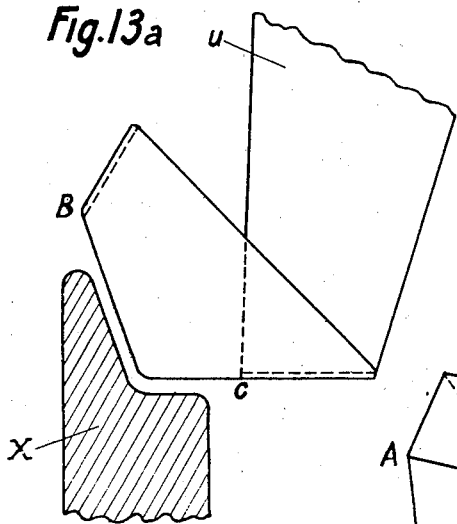
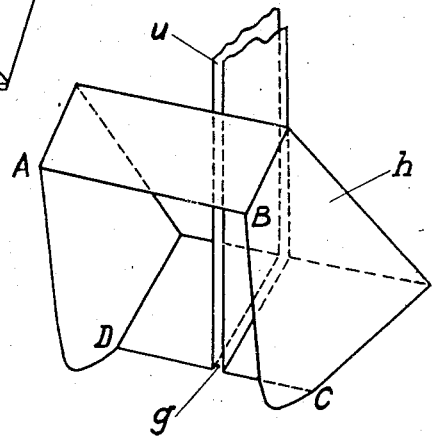
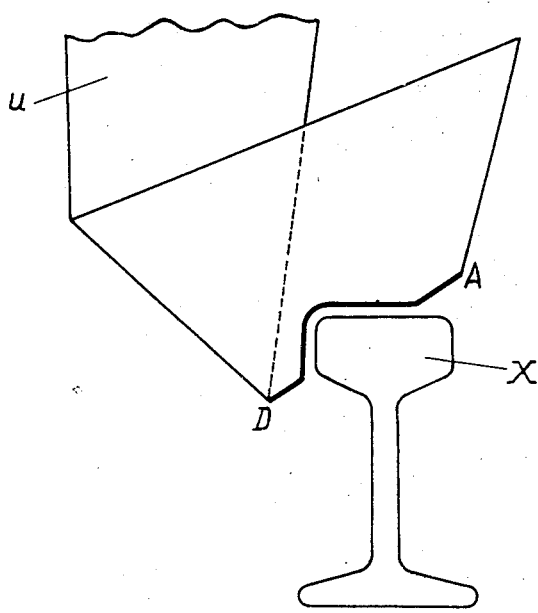
INVENTOR
EDOUARD ACHARD
By Haseltine, Lake & Co.
ATTORNEYS

May 30, 1950  E. ACHARD  2,509,713
DEVICE FOR OBTAINING ELECTRIC FIELDS OF
HIGH-FREQUENCY AND GREAT INTENSITY AND
APPARATUS EMBODYING SUCH DEVICES
Fig.15
Fig.17
Fig.16
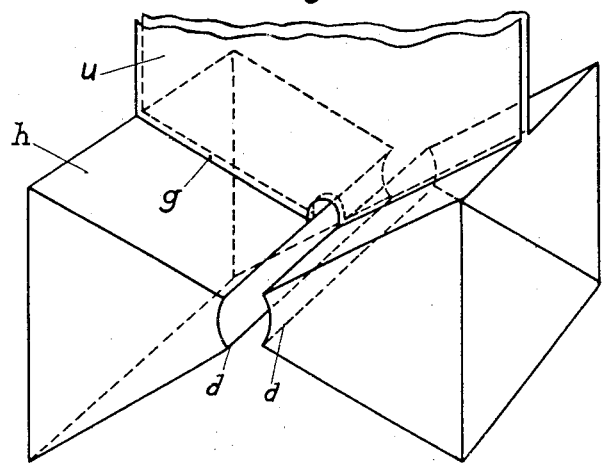
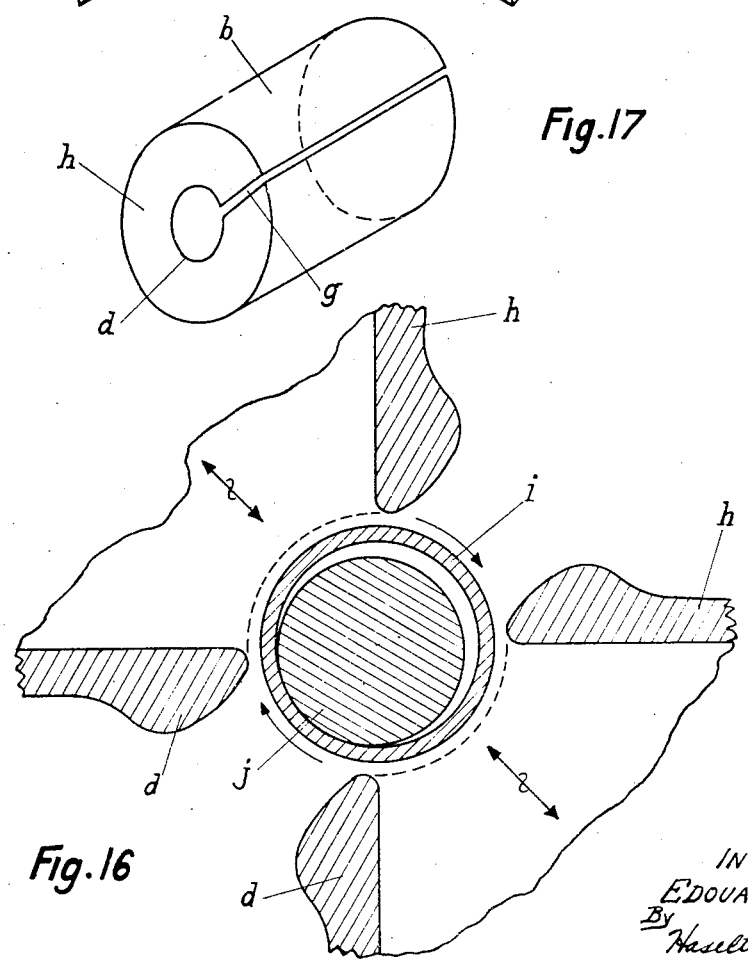
INVENTOR
EDOUARD ACHARD
By Haseltine, Lake & Co.
ATTORNEYS Patented May 30, 1950

2,509,713

UNITED STATES PATENT OFFICE 2,509,713

DEVICE FOR OBTAINING ELECTRIC FIELDS OF HIGH FREQUENCY AND GREAT INTENSITY AND APPARATUS EMBODYING SUCH DEVICES

Edouard Achard, Paris, France, assignor to Compagnie Generale de Telegraphie Sans Fil, a corporation of France Application May 1, 1945, Serial No. 591,328
In France April 22, 1941

Section 1, Public Law 690, August 8, 1946
Patent expires April 22, 1961

7 Claims. (Cl. 219—47)

This invention relates to devices for obtaining electromagnetic fields of high frequency and great intensity and to apparatus embodying such devices.

A well-known and convenient apparatus for concentrating a continuous or alternating low frequency magnetic field generally comprises an electromagnet, but there has never been any equivalent system in the field of high frequency.

The present invention has for its object the provision of devices which will behave to some extent like true high frequency electromagnets. Another object of the invention is to provide various methods of applying such devices and adapting supplementary members, or the formation of such devices with a view to such applications.

In the accompanying drawings:

Fig. 5A is a more complete view of the furnace of Figs. 3 and 4;

Fig. 5B shows the relationship between the primary and secondary of the furnace of Figs. 3 and 5A;

Figs. 8A and 8B are respectively a side view and a partial end view of a further embodiment;

Fig. 9 is a view in part section showing schematically the arrangement according to a still further embodiment;

Fig. 10 is an enlarged view in section of a practical application of the furnace;

Fig. 11 shows a modification of the device of Fig. 10 in accordance with the showing of Figs. 6 or 7, suitable for continuous operation;

Figs. 12A and 12B show respectively a side view and a section, on line A—B of Fig. 12A, of a still further embodiment;

Figs. 13A and 13B are respectively a side view and a perspective view of parts of a further practical application;

Figs. 14A and 14B are views similar to 13A and 13B of a comparable embodiment for treating a work-piece of different outline;

Fig. 15 is a perspective view of one form of apparatus suitable for a still further application shown in section in Fig. 16;

Fig. 17 is a perspective view of an alternative form suitable for the same practical application as Figs. 15 and 16.

Figure 1:
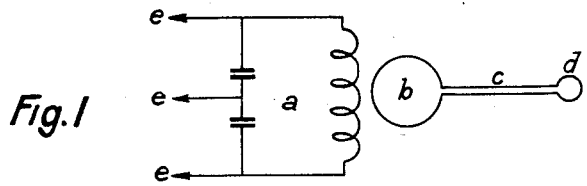
Fig. 1 is a schematic diagram of a heating circuit of known construction.
Figure 2:
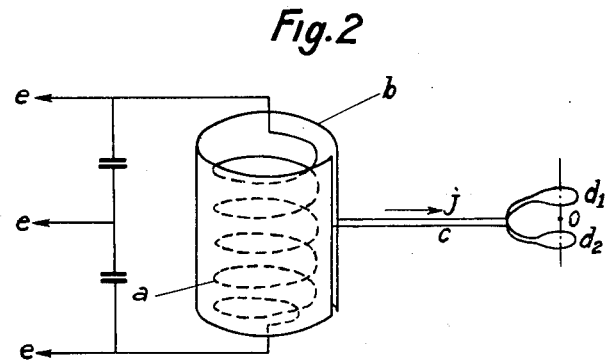
Fig. 2 is a diagram similar to Fig. 1 of a modification of the known circuit in accordance with the invention.

The invention employs the known diagram represented by Figure 1 in which $a$ represents an oscillating circuit constructed for example in the form of an anti-resonant circuit supplied at $e$ by an oscillator electron valve (this circuit could equally well be constituted by a resonant system supplied by an alternator or any other source of small internal impedance). To the self-inductance of this circuit there is coupled in as close a manner as possible a single turn coil $b$ of large diameter connected by a lead $c$ of very small characteristic impedance to a coil $d$ of small diameter. The current induced in the coil $b$ traverses the coil $d$. An application of this arrangement to the present invention is shown in Figure 2, in which the coil $b$ is represented by a cylinder slit along a generating line and rigidly coupled to the self-inductance of the oscillating circuit $a$. The lead $c$ conducts the current of $b$ to two small parallel spirals $d_1$ and $d_2$.

The field $H_1$ in the interior of $b$ consists approximately for a current $I$ of:

$$H_1 = K1/R_1$$

where $R_1$ is the mean geometrical distance between the point under consideration and the inner surface of the coil $b$, $K$ being a constant, whilst the field $H_2$ between the coils $d_1$ and $d_2$, for example at $0$, is:

$$H_2 = K1/R_2$$

where $R_2$ is the mean geometrical distance from the point $0$ to the two coils $d_1$ and $d_2$.

The field produced is proportional to the current and inversely proportional to the diameter of the coil. There is thus obtained at the point $0$ a stronger field than that which would exist at the centre of $b$. Deduction made of the primary field in opposition, the field $H_2$ is equal to $H_1$ multiplied by the ratio of the diameters of the spirals.

It will thus be easily seen that considerable ratios of $H_2/H_1 = R_1/R_2$ can be attained.

The invention consists in improving the devices according to the above considerations and comprising in their most general form of embodiment, an armature in the form of a split closed surface, a concentration coil and a lead connecting this coil to the said surface. The improvement consists in the employment as the concentration coil of the periphery, or the region adjacent to the periphery of the small base of a substantially frustum or pyramidal surface (this expression also comprising plane surfaces obtained by considering a plane as a cone with a subtending angle of 180°). This surface comprises a slot extending the cut of the coil, and it may be furthermore provided with one or more supplementary slots not cutting the coil. The periphery of the large base of this surface, or the rims of its slit, are in connection, either through a suitable lead, or directly (the surface in question then itself forming a lead) with the edges or the rims of the slit or the armature surface the section of which may be as desired.

The spiral may furthermore assume the form of a hollow body or of a closed surface (almost at the slit) having a section of any form whatever, for example but not necessarily, circular or rectangular.

With this arrangement it is possible by giving a suitable flat or crocked form to the coil and to the surface forming it, to adapt it in a particularly easy manner to the shape of the part to be treated, whilst at the same time retaining a strong concentration of the field and a large cooling surface of the pole piece of the pseudo-magnet thus constituted.

The invention will be better understood by considering the various embodiments hereafter described by way of non-restrictive examples.

Figure 3:
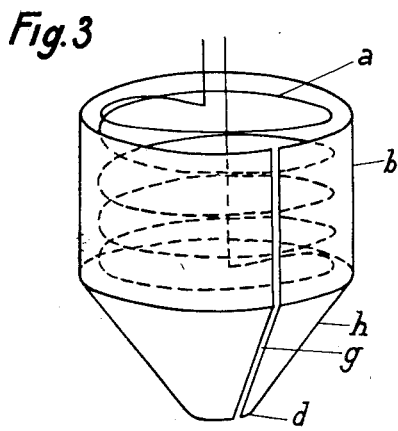
Fig. 3 is a view of part of a first embodiment of furnace according to the invention, Fig. 4 being a diagram showing the path of current.
Figure 4:
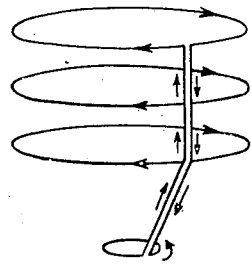

The first embodiment is shown in its principle by Figure 3 in which there are used the same references as are employed in Figures 1 and 2. There will be seen at $a$ the primary circuit, at $b$ the secondary coil of large diameter coupled to $a$. The cylindrical body of $b$ is extended by a soldered frustum $h$; the whole forms a surface of revolution slit on the generatrice $g$, the edges of the slit constituting the lead conducting the current to the extremity $d$ of the frustum constituting the concentrating field coil. It is known that in high frequency the currents are superficial and follow the lines of least impedance, so that diagrammatically the route of the current is represented by Figure 4 where it has been deemed sufficient to represent three lines for the current on the cylindrical body.

The frustum, in addition to the active role of producing the current on the rims of the slit, only comes into operation, for cooling the terminal coil $d$ and the rims $g$. In order to avoid the possible propagation of the current externally of the terminal spiral when the latter increases in temperature, it is advisable to slit the frustum on one or more supplementary generatrices, which slits naturally do not cut the terminal coil.

In order to increase the cooling of the parts likely to become heated, it is advisable to make the whole in copper of considerable thickness with the addition of a circulation of water or any other suitable liquid or compressed gas. Cooling fins suitably arranged may also be used.

A preferred embodiment is shown by Figures 5A and 5B in which the cylindrical body $b$ is surmounted by a slit dome $s$ of insulating material supporting a terminal cap $t$ connected to the high tension high frequency source and acting as a conductor for the primary current, the other extremity of the primary being connected to the secondary block $b$, which is earthed, the whole thus forming a protected circuit. The slits of the frustum $h$ are shown at $v$. Water circulating piping $f$ is shown on the surface of the parts (or made in their thickness). The water is admitted at $m$, circulated along the right rim of the slit, around the terminal coil, up the left rim of the slit, and passes to the interior at $n$ in order to cool the primary circuit constituted by one of the tubular spirals, and then leaves at P.

Figure 6:
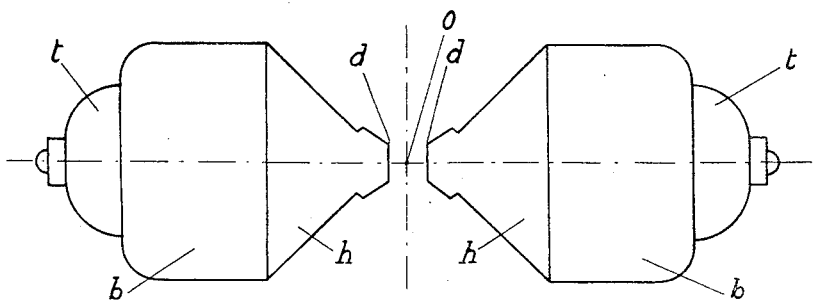
Fig. 6 shows how two of the devices of Fig. 5A may be concentrated on a single work-piece, and Fig. 7 how the bodies of the two devices may be combined into a single unit.

By combining two of these units, the device represented by Figure 6 is obtained.

The field is concentrated in the region of the symmetrical centre O. Otherwise the figure does not require any explanation, the references being those of the preceding figures.

Another embodiment of the invention is shown by Figure 7 where the bodies $b$ of Figure 6 have been combined into a single body. In this arrangement the slit follows the course shown by the heavy line of the drawing.

There may also be used in this embodiment a single circulation similar to that described with reference to Figure 5A for the cooling of the secondary block and of the primary circuit.

Another embodiment of the invention is shown by Figures 8a and 8b representing two perpendicular views.

In this embodiment the lead is constituted by two plates $u$ of copper arranged very close to one another and insulated by a very thin air space or sheets of mica or any other suitable insulator. In the example shown, this lead supplies two coils $d$ connected to frustums $h$ slit at $v$ to increase the dissipation of heat.

In all the preceding examples, the primary coil has been shown inside the secondary. It may sometimes be advantageous to arrange the primary outside the secondary, for example in the particular case where it is necessary to heat a long piece on its straight section, in devices such as that according to Figures 5 and 6, so that the said piece can pass through the interior of the device.

It is also possible to arrange the primary as shown in Figure 9 inside a double secondary coil slit and extended by a single or double cone $h$ which may be terminated by a single or double coil $d$.

There will now be described several applications of the system by way of non-restrictive examples, and various adaptations to these applications.

One of the important applications is the tempering of metals by employing the high frequency field as the source of heat. It is well known that when a piece of metal is placed in a high frequency field, there are developed in a slight thickness of the metal eddy currents (Foucault currents). The thickness of metal utilised by the current is inversely proportional to the frequency. When the field is intense the eddy currents cause a rapid superficial heating of the metal which may be tempered at the surface by using either a natural cooling (air tempering) or an artificial cooling by a jet or bath.

It is advisable to point out here that in the application the term used of "air tempering" is not correct, for when using the heat caused by high frequency currents the part of the metal heated is a small portion of the total volume and the cooling is not effected by the air but rather by conduction into the mass of the metal.

The system forming the object of the invention permitting of obtaining very dense fields renders air tempering possible in many cases which hitherto it has been impossible to obtain.

A first method of application which will be described below relates to the tempering of a gear pinion.

For convenience and in order to adhere to precedence, the coil or coils which induce current in the piece to be heated will be termed "the furnace."

To temper a pinion there will preferably be used a conical furnace represented in section by Figure 10, it being understood that the piece shown may form a pole piece of any one of the units previously described.

In this drawing $h$ represents the section of the furnace, $x$ the pinion to be tempered, $y$ a water distributing ring cut by an insulating sleeve $z$ and supplied by means of a mechanism not shown comprising an automatic valve actuated by gearing controlled by the opening of the electric circuit. It is pointed out that the piece to be tempered is located in such a manner as to permit easy and rapid manipulation.

With a bi-cone furnace there may be tempered in a minimum time a chain of pinions preliminarily mounted at a suitable distance on the same shaft. Figure 11 represents diagrammatically and in section the said device.

In this figure, $h$ indicates the bi-conical furnace, $x$ the chain of pinions mounted for manipulation on a shaft $q$ and separated by a suitable distance by blocks $r$; $y$ is the annular water distributor.

An automatic device which it is easy to imagine, controls the advance step by step of the train of pinions, the application and the cutting off of the current and the opening and the breaking of the jet of water.

To temper in a discontinuous manner a pinion of large diameter, there will be employed the pyramidal furnace shown in elevation by Figure 12a and in section on the line AB by Figure 12b.

By using this system of furnace, the heating of the piece may be localised only to those parts which have need of tempering. The furnace shown is provided for the simultaneous tempering of three teeth; obviously this number may be increased if a larger power is available.

In Figures 12a and 12b, $x$ indicates the pinion, $h$ the furnace, the extremity $d$ of which is, in this case, of rectangular section, $k$ the partitioning which forces the current to follow the contour of the teeth, $l$ cooling fins also increasing the path of the currents which may also be joined together at their tips.

The manipulation takes place preferably by vertical displacement of the furnace and the rotation of the pinion about its axis.

A second application of the system is the tempering in a continuous manner by water or air of a wheel tyre, a rail or any other piece utilising the principle thereof.

For the wheel tyre of a wagon, the furnace is, for example, of prismatic form shown diagrammatically in side view by Figure 13a and in perspective by Figure 13b in which $x$ indicates the wheel tyre, $h$ the furnace without the accessory cooling parts, A B C D the contour of the mouth of the furnace, $g$ the slit of the furnace, $u$ the supply lead composed of two plates similar to the like elements of Figure 8. It will be noted that the furnace mouth is wider in the direction AD or BC than the dimensions of the object to be treated. The object of this arrangement is that the edges AB and CD are not opposite the tyre. In the opposite case, in effect, during the rotation of the wheel with a view to its continuous tempering, the edges AB and CD would exert on each point of the surface treated a more prolonged action than the perpendicular edges AD and BC and would produce a local overheating. This possibility of overheating is compensated by the overhanging of the mouth of the furnace which is shown on the figure.

The furnace will obviously comprise other accessory parts not shown, such as rollers or shoes for guiding the furnace on the piece, in order to regulate in a precise manner the position of the furnace with respect to the heated piece, which is of considerable importance if it is desired to obtain a very uniform tempering.

Figure 14B:
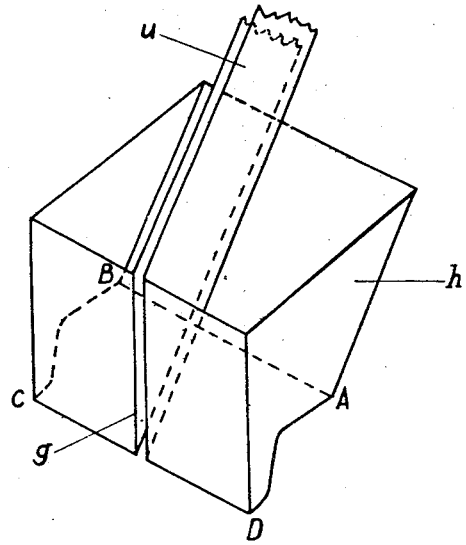

For a rail, the furnace is also used in a prismatic form with the mouth having a profile adapted exactly to the part of the rail to be tempered. Figure 14a is a diagrammatic representation in profile of the rail and of the furnace, this latter being shown in perspective by Figure 14b. The heavy line indicates the profile of the mouth. The same references in Figures 13 (A and B) and 14 (A and B) correspond to the same parts.

A third application of the system is the tempering of balls of ball bearings. There will be described by way of non-restrictive examples, two systems of the furnace suitable for this application.

The first is constituted by a double prismatic furnace shown diagrammatically in isometric projection by Figure 15 on which will be found the references of Figure 8, 13 and 14 indicating the same members.

Between the coils $d$ in the region of field concentration, there is introduced a tube of quartz or of ceramic material to which is imparted a movement of rotation with a suitable inclination. The ball passes into the tube, runs through it by gravitation, whilst at the same time the rotating movement of the tube causes it to present successively the whole surface of the ball to the field. The hot ball then falls into a bath on its exit from the tube.

Figure 16 is a view in radial section of the complete arrangement. The quartz tube is indicated by $i$ and the ball by $j$. The whole of the parts $h$ are inclined to the vertical in order to take into account the driving of the balls by the surfaces of the tube in rotation.

Figure 18:
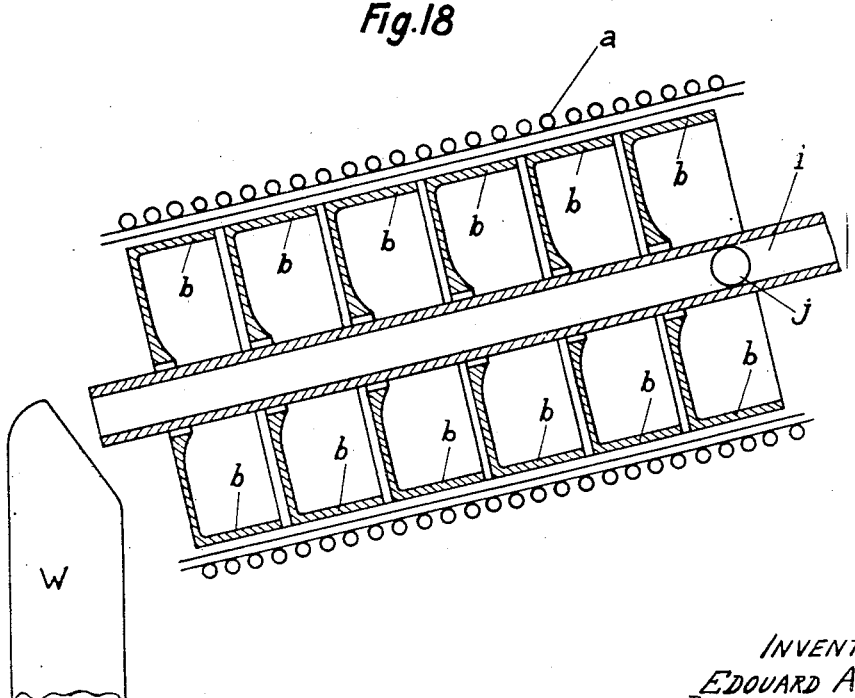
Fig. 18 is an axial section through a chain of furnaces of the type shown in Fig. 17.

The second furnace system is constituted by a chain of furnaces coupled to the same primary circuit. One of the furnaces is shown in perspective in Figure 17. In this case, the conical surface $h$ has been replaced by a flat surface having the same reference and this form may be considered (as pointed out at the outset) as a particular kind of cone with a subtending angle of 180°. The chain of these furnaces is shown in longitudinal section by Figure 18 in which $a$ indicates the primary circuit, $b$ the chain of furnaces the mouths of which surround a tube of quartz or of ceramic material $i$ to which is imparted a movement of rotation driving by friction the ball $j$ which, moving otherwise by a cycloidal movement, presents to the field during its travel, the whole of its surface. The ball on leaving the tube falls into a tempering bath $w$.

What I claim is:

1. A transformer for an induction heating device comprising a primary which is intended to be connected to a high voltage source of current, a secondary consisting in a split body encircling the primary in the manner of a protection screen, a heat dissipating surface integral with said secondary, of which it constitutes an extension, a concentration turn, intended to concentrate the electromagnetic heating field and which, for the purpose of its efficient cooling, is made integral with the external periphery of said surface, the transverse sections of which, in planes parallel to that of the concentration turn, are defined by closed contours interrupted by the edges of a slot, said edges being adapted to convey to the concentration turn, the current flowing through the edges of the slot of said secondary.

2. A transformer according to claim 1, in which said closed contours are also interrupted by the edges of at least one additional slot, which are arranged in such a manner as to avoid the formation of lines of parasitic currents external to the concentration turn.

3. A transformer for an induction heating device comprising a primary which is intended to be connected to a high voltage source of current, a secondary consisting in a split body encircling the primary in the manner of a protection screen, a heat dissipating surface integral with said secondary, said surface having a convergent shape derived from that of a frustum of a pyramid and being provided with a slot arranged as an extension of the slot of said body and the edges of which connect the two bases of the frustum, and a concentration turn intended to concentrate the electromagnetic heating field and which for the purpose of being efficiently cooled by the frustum, is constituted by the region in close proximity to the small base of the latter.

4. A transformer for an induction heating device comprising a primary coil which is intended to be connected to a high voltage source of current, a secondary consisting in a split body of revolution surrounding the primary and surrounded by an insulating dome supporting a terminal conducting cap through which the current lead-in to the primary is intended to be effected, a heat dissipating surface having a convergent shape derived from that of a frustum of a pyramid, extending said body and being provided with a slot arranged as an extension of the slot of the body and the edges of which connect the two bases of the frustum, a concentration turn intended to concentrate the electromagnetic heating field and which for being efficiently cooled by the frustum, is constituted by the region in close proximity to the small base of the latter and a circulating piping for a cooling fluid, surrounding the concentration turn and running along the current lead-in slots and said primary.

5. A transformer as claimed in claim 3, assuming the shape of a horseshoe, the secondary of the transformer, constituted by a single turn being located in the central part and two heat dissipating surfaces being arranged respectively at the extremities of the two branches, in such a manner that the two concentration turns produce between them a space in which the field produced is particularly intense.

6. A transformer as claimed in claim 3, wherein the primary is located between two split rings constituting a double secondary these rings being respectively extended by two heat dissipating surfaces having a shape derived from that of a frustum of a pyramid, slotted and convergent in such a manner as to constitute a single concentration turn.

7. In an induction heating device, the association of at least two transformers as claimed in claim 3, wherein the frustums are arranged face to face in such manner that the respective concentration turns are located in the vicinity of one another and so as to leave between them a space through which the work piece is intended to pass, and wherein an annular cooling fluid conduit passing through the interior of the frustums is adapted to project the cooling fluid against said work piece.

EDOUARD ACHARD.

REFERENCES CITED

The following references are of record in the file of this patent:

UNITED STATES PATENTS

| Number | Name | Date |
|---|---|---|
| 1,378,187 | Northrup | May 17, 1921 |
| 1,909,982 | Parker | May 23, 1933 |
| 2,103,716 | Frickey | Dec. 28, 1937 |
| 2,181,899 | Kennedy | Dec. 5, 1939 |
| 2,268,346 | Somes | Dec. 30, 1941 |
| 2,279,027 | Weed et al. | Apr. 7, 1942 |
| 2,293,533 | Denneen et al. | Aug. 18, 1942 |
| 2,299,934 | Sherman et al. | Oct. 27, 1942 |
| 2,353,130 | Dravneck | July 11, 1944 |
| 2,383,992 | Sherman | Sept. 4, 1945 |
| 2,385,904 | Witty | Oct. 2, 1945 |
| 2,408,229 | Roberds | Sept. 24, 1946 |

FOREIGN PATENTS

| | | |
|---|---|---|
| 472,198 | Great Britain | Sept. 20, 1937 |